(12) United States Patent
Huang et al.

(10) Patent No.: US 12,148,326 B2
(45) Date of Patent: Nov. 19, 2024

(54) ELECTRONIC LABEL AND DISPLAY METHOD THEREOF

(71) Applicant: M2Communication Inc, Zhubei (TW)

(72) Inventors: Hsin-Yu Huang, Zhubei (TW); Su-ching Huang, Zhubei (TW); Kuo-Chih Chang, Zhubei (TW)

(73) Assignee: M2COMMUNICATION INC., Zhubei (TW)

( * ) Notice: Subject to any disclaimer, the term of this patent is extended or adjusted under 35 U.S.C. 154(b) by 228 days.

(21) Appl. No.: 17/756,830

(22) PCT Filed: Dec. 5, 2019

(86) PCT No.: PCT/CN2019/123212
§ 371 (c)(1),
(2) Date: Jun. 3, 2022

(87) PCT Pub. No.: WO2021/109058
PCT Pub. Date: Jun. 10, 2021

(65) Prior Publication Data
US 2023/0008593 A1    Jan. 12, 2023

(51) Int. Cl.
*G09F 3/20* (2006.01)
*G06F 3/04886* (2022.01)

(52) U.S. Cl.
CPC .......... *G09F 3/208* (2013.01); *G06F 3/04886* (2013.01)

(58) Field of Classification Search
CPC .............................. G09F 3/208; G06F 3/04886
See application file for complete search history.

(56) References Cited

U.S. PATENT DOCUMENTS

| | | | | |
|---|---|---|---|---|
| 2006/0049248 | A1* | 3/2006 | Becker | G06Q 10/087 235/385 |
| 2007/0046560 | A1* | 3/2007 | Neugebauer | G09F 9/30 345/1.1 |
| 2010/0088937 | A1* | 4/2010 | Lee | G09F 3/20 40/642.02 |
| 2013/0036636 | A1* | 2/2013 | Karhuketo | H01Q 9/0421 40/299.01 |
| 2014/0019910 | A1* | 1/2014 | Kim | G06F 3/0486 715/810 |
| 2014/0250391 | A1 | 9/2014 | Jong et al. | |

(Continued)

FOREIGN PATENT DOCUMENTS

CN            105094538          11/2015

*Primary Examiner* — Gary C Hoge
(74) *Attorney, Agent, or Firm* — Michael W. Taylor; Wolter, Van Dyke, Davis PLLC

(57) ABSTRACT

A display method for an electronic label having a display area is disclosed. The display method includes the following steps. A plurality of visual contents to be displayed are predefined, wherein each of the visual contents has a first state and a second state corresponding to a first state display subpage and a second state display page respectively. The display area is divided into a plurality of first sub-areas for displaying the plurality of first state display subpages respectively. A second sub-area operable for selection of a specific one from the plurality of first state display subpages is provided in each of the first sub-area in response to a first instruction of a user. The display area is caused to display the second state display page corresponding to the specific first state display subpage in response to a second instruction of the user.

7 Claims, 9 Drawing Sheets

(56) References Cited

U.S. PATENT DOCUMENTS

2015/0220255 A1 8/2015 Maeda
2018/0335936 A1* 11/2018 Missig ................ G06F 3/04883
2020/0057823 A1* 2/2020 McCarty ............... G06F 3/0237

* cited by examiner

ELECTRONIC LABEL AND DISPLAY METHOD THEREOF

TECHNICAL FIELD

Embodiments in the present disclosure are related to an electronic label and display method thereof, and more particularly to an electronic label for saving a display time period when updating and display method thereof.

BACKGROUND

An electronic label is usually made using electronic ink (E-ink) paper, which the electrophoretic display (EPD) technology is applied to. The E-paper display device and its manufacture are similar to a liquid crystal display (LCD) device, but they use different materials. The E-paper includes micro capsules, and each of the micro capsules has color elements with a positive or negative charge, such as black, white, red and yellow, etc. For example, the white color elements have positive electricity, and the black color elements have negative electricity. These color elements with a positive or negative charge form an electric-magnetic material having the characteristic of hysteresis. The micro capsule is arranged between two electrodes to which different voltages are applied. When a first voltage being a positive voltage or a negative voltage is applied between the two electrodes, the white color elements with a positive charge in the micro capsule are attracted to one electrode, and the black color elements with a negative charge in the micro capsule are expelled to another electrode. When the first voltage is off, the hysteresis characteristic causes the electric-magnetic material to keep its magnetic force, the visual contents will still keep for a long time without applying battery power, and therefore the efficacy of saving power of EPD is better than that of an LCD display.

Please refer to FIG. 1A, which is a schematic diagram showing an E-paper EP in the prior art. The E-paper includes an upper layer 1, a transparent electrode layer 2, a transparent micro capsule 3, white color elements 4 with positive charge, black color elements 5 with negative charge, a transparent liquid 6, an electrode pixel layer 7 and a substrate 8. The E-ink can be regarded as lots of micro capsules 3, 3', and 3". When a positive voltage V1 is applied to the electrode pixel layer 7, the white color elements 4 with a positive charge in the transparent micro capsule 3 are attracted to the transparent electrode 2, and the black color elements 5 with a negative charge in the transparent micro capsule 3 are expelled to (or attracted by) the electrode pixel layer 7. The incident light 9 passes through the upper layer 1, the transparent electrode layer 2 and the transparent micro capsule 3, reaches to the white color elements 4 with a positive charge, which can reflect the incident light 9 to form a reflection light 10 to display a white color for a viewer. One example shows black and white colors displayed in the same micro capsules 3".

Similarly, when a negative voltage V2 is applied to the electrode pixel layer 7, the white color elements 4 with a positive charge in the transparent micro capsule 3' are attracted to the electrode pixel layer 7, and the black color elements 5 with a negative charge in the transparent micro capsule 3 are expelled to (or attracted by) the transparent electrode 2. The incident light 9 passes through the upper layer 1, the transparent electrode layer 2 and the transparent micro capsule 3', reaches to the black color elements 5 with a negative charge, which can reflect the incident light 9 to form a reflection light 11 to display a black color for the viewer.

Please refer to FIG. 1B, which is a schematic diagram showing a hysteresis curve CV1 of the black and white color elements 4, 5 with charges in the prior art. The horizontal axis represents the voltage applied to the electrode pixel layer 7, and the vertical axis represents the magnetic force at which the white color elements 4 with a positive charge or the black color elements with a positive charge is maintained. Please refer to FIGS. 1A and 1B, when the positive voltage V1 is applied to the electrode pixel layer 7 (as referring to point B), and then the positive voltage V1 is off, i.e., voltage=0, the magnetic force of the white color elements 4 with a positive charge and the black color elements 5 with a negative charge in the transparent micro capsule 3 is maintained (as referring to point C). In order to remove the magnetic force, a refreshing process must be performed. Similarly, when the negative voltage V2 is applied to the electrode pixel layer 7 (as referring to point D), and then the negative voltage V2 is off, i.e., voltage=0, the magnetic force of the white color elements 4 with a positive charge and the black color elements 5 with a negative charge in the transparent micro capsule 3' is maintained (as referring to point A). In order to remove the magnetic force, a refreshing process must be performed.

However, when visual contents need to be changed, some pixels need to refresh, the magnetic force needs to be removed, so that new visual contents can be updated, and this process of removing the magnetic force is a refreshing process. Typically, the refresh period of time is about several tens of seconds, and that's very time consuming. In addition, frequent refreshing also wastes more power. Therefore, a way to save power and save the refresh period for the electronic paper and the display method is the next step to improve the technology.

Furthermore, the color E-paper uses a similar technique to display color pixels, the difference is that the magnitude of the voltage is applied to the electrode pixel. For example, red color elements with a negative charge (not shown) can be also in the transparent micro capsule 3', a first magnitude of a positive voltage is applied to the transparent electrode 2 to attract the red color elements with a negative charge, and a second magnitude of a positive voltage is applied to the transparent electrode 2 to attract the black color elements 5 with a negative charge. It is also expected to save power and save the refresh period for the color E-paper and a display method thereof.

SUMMARY OF EXEMPLARY EMBODIMENTS

The present disclosure provides an electronic label and a display and a display method thereof, which can save the update period (refreshing period) and power.

Accordingly, the display method for the electronic label having a display area includes the following steps: A plurality of images to be displayed is predefined, wherein each of the images has a first state and a second state corresponding to a first state display subpage and a second state display page respectively, and the first state display subpage is a minified version of the second state display page. The display area is divided into a plurality of first sub-areas and the plurality of first state display subpages are disposed on the plurality of first sub-areas respectively for a user to preview. A second sub-area being operated for a selection of a specific first display subpage from the plurality of first state display subpages is provided in each of the first sub-areas.

A specific one of the plurality of first sub-areas showing a corresponding one of the first state display subpages is selected in response to a first instruction of the user. The display area is activated to display the second state display page corresponding to the specific first display subpage in response to a second instruction of the user.

The present invention provides an electronic label, which includes a display module, a control module and an operating module. The display module has a display area. The control module is electrically connected to the display module, and is configured to: predefine a plurality of images to be displayed, wherein each of the images has a first state and a second state corresponding to a first state display subpage and a second state display page respectively, and the first state display subpage is a minified version of the second state display page; and divide the display area into a plurality of first sub-areas and dispose the plurality of first state display subpages on the plurality of first sub-areas respectively for a user to preview. The operating module is electrically connected to the control module, wherein the control module is set to include in each of the first sub-areas a second sub-area operable for selection of a specific one from the plurality of first state display subpages, selects a specific one from the plurality of first sub-areas displaying a corresponding one of the first state display subpages in response to a first instruction of the user, and causes the display area to display the second state display page corresponding to the specific first state display subpage in response to a second instruction of the user.

The present invention provides a display method for an electronic label having a display area. The display method includes the following steps: A plurality of visual contents to be displayed is predefined, wherein each of the visual contents has a first state and a second state corresponding to a first state display subpage and a second state display page respectively. The display area is divided into a plurality of first sub-areas for displaying the plurality of first state display subpages respectively. A second sub-area operable for selection of a specific one from the plurality of first state display subpages is provided in each of the first sub-areas in response to a first instruction of a user. The display area is activated to display the second state display page corresponding to the specific first state display subpage in response to a second instruction of the user.

The above embodiments and advantages of the present invention will become more readily apparent to those ordinarily skilled in the art after reviewing the following detailed descriptions and accompanying drawings.

DETAILED DESCRIPTION OF THE PREFERRED EMBODIMENTS

Please refer to all figures of the present invention when reading the following detailed description, wherein all figures of the present invention demonstrate different embodiments of the present invention by showing examples, and help the skilled person in the art to understand how to implement the present invention. However, the practical arrangements and the present method provided to implement the present invention is not necessary to completely comply with the descriptions in the specification. The present examples provide sufficient embodiments to demonstrate the spirit of the present invention, each embodiment does not conflict with the others, and new embodiments can be implemented through an arbitrary combination thereof, i.e., the present invention is not restricted to the embodiments disclosed in the present specification.

Figure 1A:
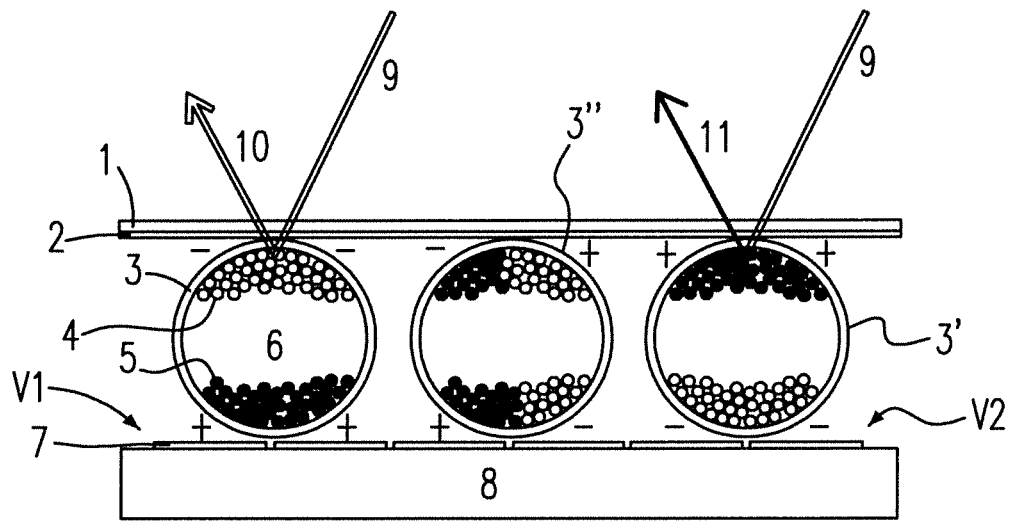
FIG. 1A is a schematic diagram showing an E-paper in the prior art.
Figure 1B:
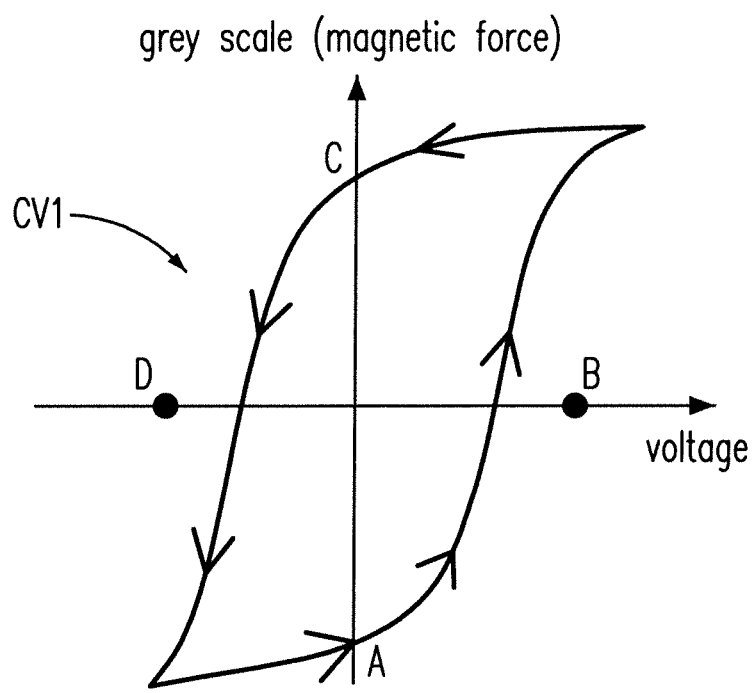
FIG. 1B is a schematic diagram showing a hysteresis curve of the black and white color elements in the prior art.
Figure 2:
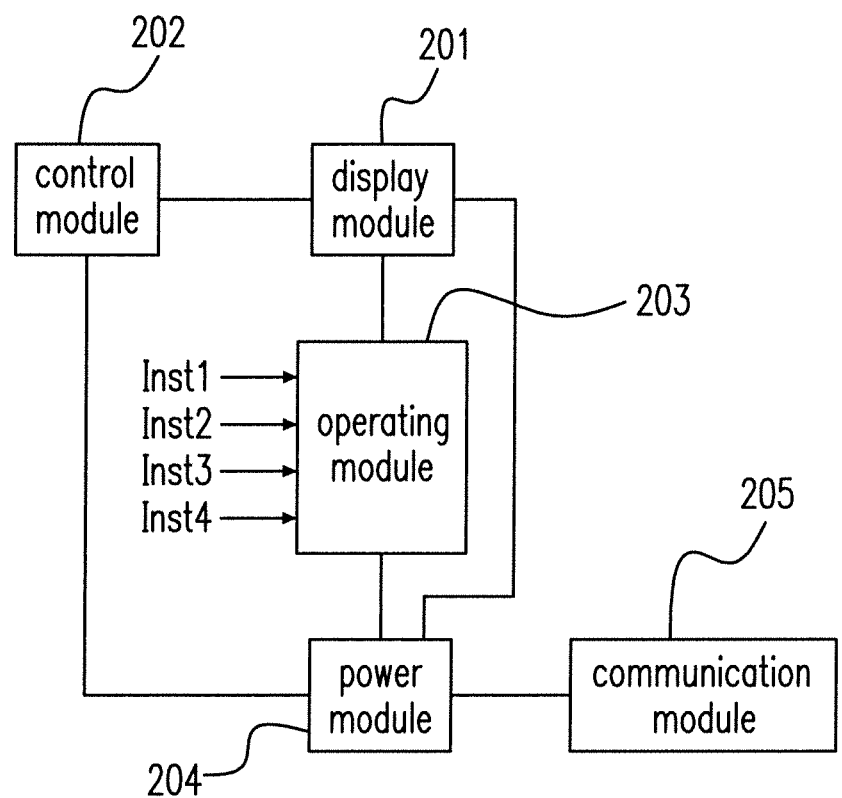
FIG. 2 is a schematic diagram showing an electronic label 20 in accordance with a preferred embodiment of the present invention.
Figure 3:
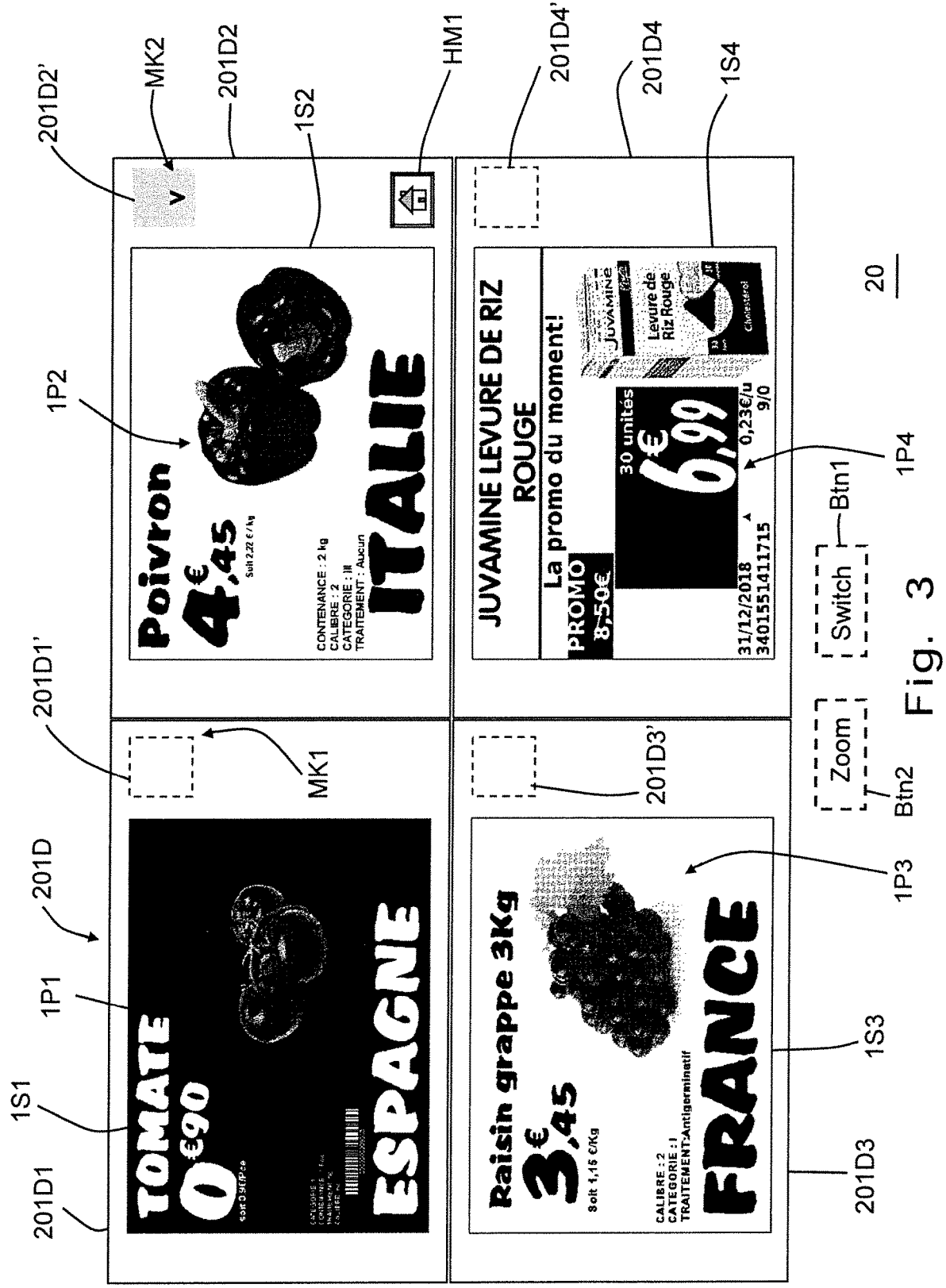
FIG. 3 is a schematic diagram showing a selected subpage of the electronic label in a preview mode in accordance with a preferred embodiment of the present invention.
Figure 4:
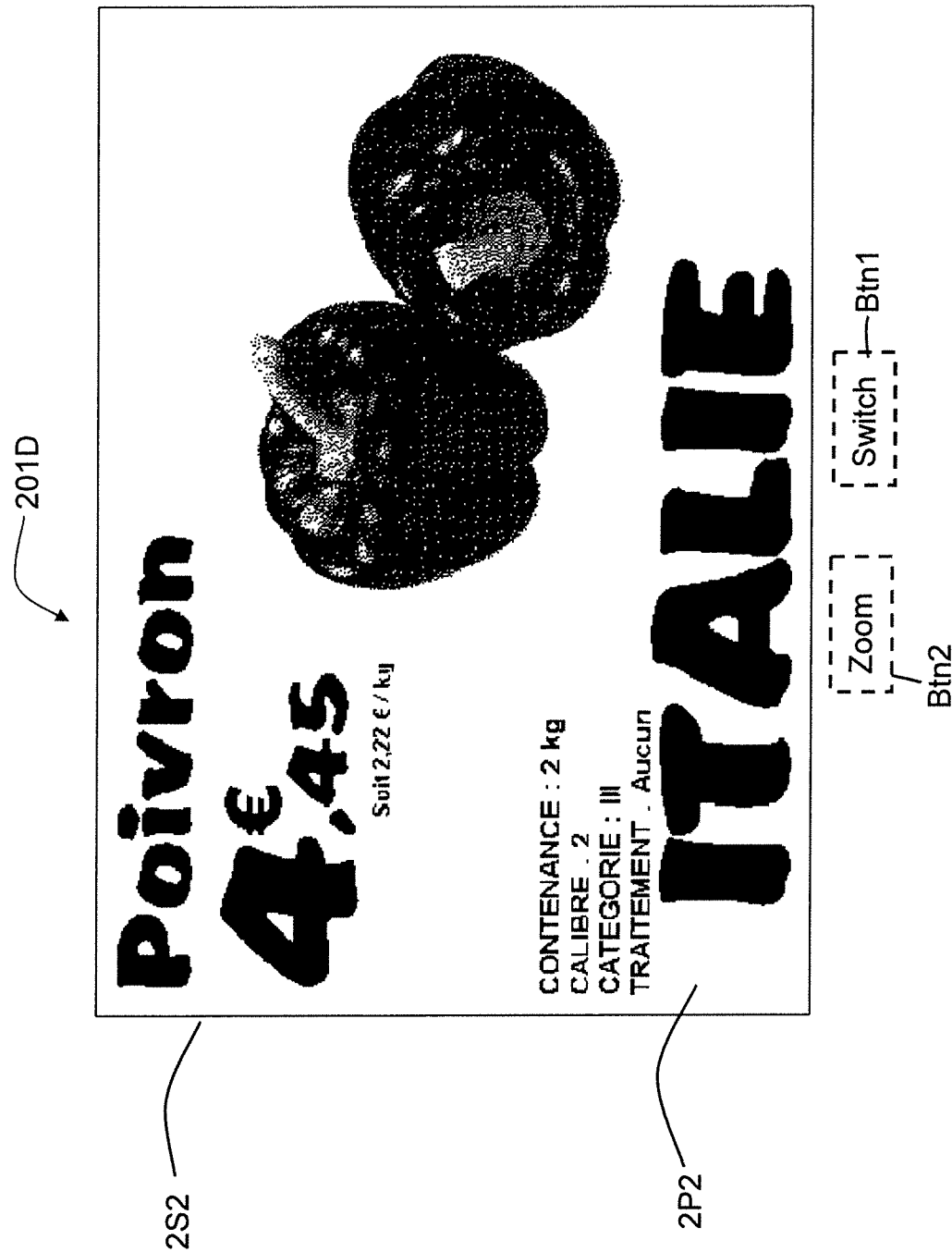
FIG. 4 is a schematic diagram showing an enlarged page of the selected subpage in a zoom-in mode in accordance with a preferred embodiment of the present invention.

Please refer to FIG. 2, which is a schematic diagram showing an electronic label 20 in accordance with a preferred embodiment of the present invention. Please refer to FIG. 3, which is a schematic diagram showing a selected subpage 1S2 of the electronic label 20 in a preview mode in accordance with a preferred embodiment of the present invention. Please refer to FIG. 4, which is a schematic diagram showing an enlarged page 2S2 of the selected subpage 1S2 in a zoom-in mode in accordance with a preferred embodiment of the present invention. As shown in FIGS. 2, 3 and 4, the electronic label 20 includes a display module 201, a control module 202 and an operating module 203. The display module 201 has a display area 201D. The control module 202 is electrically connected to the display module 201, and is configured to predefine a plurality of images 1P1, 1P2, 1P3 and 1P4 to be displayed, wherein each of the images 1P1, 1P2, 1P3 and 1P4 has a first state and a second state corresponding to a first state display subpage (such as 1S1, 1S2, 1S3 or 1S4) and a second state display page (such as 2S1, 2S2, 2S3 or 2S4) (only 2S2 is shown) respectively, and the first state display subpage (such as 1S1, 1S2, 1S3 or 1S4) is a minified version of the second state display page (such as 2S1, 2S2, 2S3 or 2S4). The control module 202 is configured to divide the display area 201D into a plurality of first sub-areas 201D1, 201D2, 201D3 and 201D4 and dispose the plurality of first state display subpages 1S1, 1S2, 1S3 and 1S4 on the plurality of first sub-areas 201D1, 201D2, 201D3 and 201D4 respectively for a user to preview. The operating module 203 is electrically connected to the control module 202, wherein the control module 202 is set to include in each of the first sub-areas 201D1, 201D2, 201D3 and 201D4 a second sub-area 201D1', 201D2', 201D3' and 201D4' operable for selection of a specific one from the plurality of first state display subpages 1S1, 1S2, 1S3 and 1S4, selects a specific one from the plurality of first sub-areas 201D1, 201D2, 201D3 and 201D4 displaying a corresponding one of the first state display subpages 1S1, 1S2, 1S3 and 1S4 in response to a first instruction Inst1 of the user, and causes the display area 201D to display the second state display page 2S2 corresponding to the specific first state display subpage 1S2 in response to a second instruction Inst2 of the user. In this preferred embodiment, the selected first state subpage 1S2 is shown in FIG. 3, its corresponding second state display page 2S2 is shown in FIG. 4, and the operation for another specific first state display subpage and corresponding second state display page is similar.

The operating module 203 may be an interface unit that can communicate with the user and the electronic label 20. For example, the operating module 203 includes a physical button(s) or a virtual button(s), and receives at least one selected from a group consisting of voice(s), sound(s), gesture(s) and so on. In FIG. 3, two keys or buttons Btn1 and Btn2 are used to select and zoom in/zoom out respectively, and they can be physical or virtual buttons. When Buttons Btn1, Btn2 are pressed or touched, different instructions will be triggered to perform different operations. Here the operation "select" represents "switch" among the plurality of first state display subpages 1S1, 1S2, 1S3 and 1S4 without zoom in/zoom out. The button Btn1 shown by a text "Switch" is configured to indicate that a specific first state display page is selected in a sequential order 1/4, 2/4, 3/4 and 4/4 whenever the button Btn1 is pressed. The button Btn2 shown by texts "Zoom" is configured to indicate that the selected specific first state subpage 1S2 is zoomed into its corresponding second state display page 2S2 when button Btn2 is pressed, and its corresponding second state display page 2S2 is zoomed out to return to display respective first display subpages 1S1, 1S2, 1S3 and 1S4 including the specific selected first display subpage 1S2 in the preview mode when the button Btn2 is pressed again, as indicating by a home icon HM1.

Figure 5:
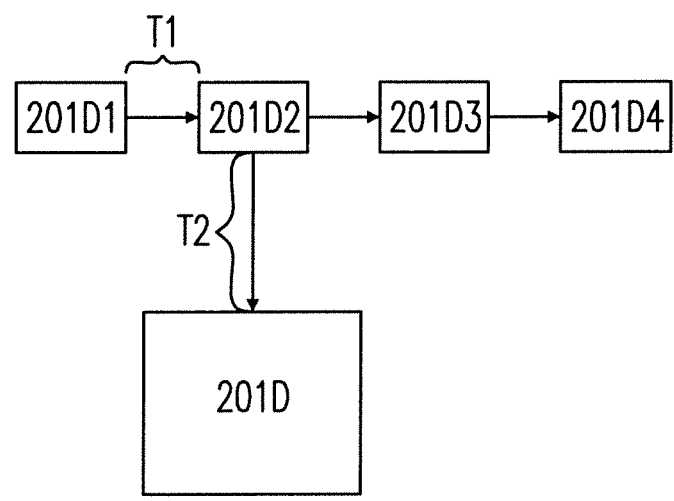
FIG. 5 is a schematic diagram showing update time periods in accordance with a preferred embodiment of the present invention.

Please refer to FIG. 5, which is a schematic diagram showing update time periods T1 and T2 in accordance with a preferred embodiment of the present invention. Please also refer to FIGS. 2, 3 and 4, in any previous embodiment, the first instruction Inst 1 allows a selection among the first sub-areas 201D1, 201D2, 201D3 and 201D4 within a first time period T1, and the second instruction Inst2 allows the display area 201D to be full of a specific second state display page 2S2 within a second time period T2, wherein the first time period T1 is shorter than the second time period T2.

In any previous embodiment, the first instruction Inst 1 causes a specific second sub-area 201D2' to be marked, and the second instruction Inst2 allows the display area 201D to be full of a specific second state display page 2S2.

In one preferred embodiment, the second sub-areas 201D1', 201D2', 201D3' and 201D4' are smaller than the first sub-areas 201D1, 201D2, 201D3 and 201D4 respectively. In FIG. 3, when the button Btn1 is pressed once, the second sub-area 201D1' will be marked by a check box MK1. When the button Btn1 is pressed twice, the second sub-area 201D2' will be marked by a check box MK2, and the second sub-area 201D1' will be demarked. Compared with the entire (full) display area 201D, the second sub-areas 201D1', 201D2', 201D3' the 201D4' are small, so that the update (refreshed) time period of the mark/demark greatly decreases. In addition, in the preview mode, the user can preview before zooming into an entire page, so it is saving more time than browsing among the entire pages because the update (refreshed) time period among the entire pages wastes lots of time and power.

In another preferred embodiment, the second sub-areas 201D1', 201D2', 201D3' and 201D4' can be equal to the first sub-areas 201D1, 201D2, 201D3 and 201D4 respectively. In this case, the second sub-areas 201D1', 201D2', 201D3' and 201D4' can cover the first sub-areas 201D1, 201D2, 201D3 and 201D4 respectively, and the specific first state subpage can be selected by using a highlight. By adjusting the different level of a grey scale at the specific first sub-area 201D2, the specific first state subpage 1S2 will show a highlight itself to the user for selection.

In another preferred embodiment, the second sub-areas 201D1', 201D2', 201D3' and 201D4' can be smaller than the first sub-areas 201D1, 201D2, 201D3 and 201D4, and be superimposed on the first state subpage 1S1, 1S2, 1S3 and 1S4 respectively.

In some preferred embodiment, only one key or button Btn1 is used to select and zoom in/zoom out respectively. The selection and zoom in/zoom out function can be implemented by pressing how many times and/or how much time period on only one key/button Btn1. For example, shortly pressing once on the button Bt1 can select the first state subpage 1S1. Shortly pressing twice on the button Bt1 can select the first state subpage 1S2, and then long pressing once on the button Btn1 can zoom in the first state subpage 1S2 to display its full page on the entire display area 201D.

Referring to FIG. 2 again, the electronic label 20 can include a power module 204 and a communication module 205. The power module 204 is electrically connected to the control module 202, and can provide each module with power, especially when the display module 201 needs to refresh the respective first sub-areas 201D1, 201D2, 201D3 and 201D4, second sub-areas 201D1', 201D2', 201D3' and 201D4' or the entire display area 201D. The control module 202 can include a memory (not shown), such as SRAM, DRAM, MRAM (magnetic RAM), cache, flash memory, disk and the like. The memory can store the first state sub pages 1S1, 1S2, 1S3 and 1S4 and the second state display pages 2S1, 2S2, 2S3 and 2S4. The communication module 205 can receive information for display, or transmit information for backup.

Please refer to FIGS. 2, 3 and 4, in any previous embodiment, the first instruction Inst 1 allows a selection among the plurality of first state display subpages 1S1, 1S2, 1S3 and 1S4; a third instruction Inst3 of the user allows browsing among the plurality of second state display pages 2S1, 2S2, 2S3 and 2S4; and the first instruction Inst1 and the third instruction Inst3 are respectively commanded through a first operation and a third operation of the user on the operating module 203.

After the second state display page (such as 2S1, 2S2, 2S3 or 2S4) displays, if the user wants to return to the preview mode, the same button Btn2 can function to zoom out to return to the respective first display subpages 1S1, 1S2, 1S3 and 1S4. In any previous embodiment, a fourth instruction Inst4 of the user changes the display area 201D from displaying the second state display page (such as 2S1, 2S2, 2S3 or 2S4) back to displaying respective first display subpages 1S1, 1S2, 1S3 and 1S4 including the specific selected first display subpage 1S2. The second instruction Inst2 and the fourth instruction Inst2 are respectively commanded through a second operation and a fourth operation of the user on the operating module 203.

In any previous embodiment, the electronic label 20 includes the memory configured to store the selected first display subpage 1S2, the plurality of first state display subpages 1S1, 1S2, 1S3 and 1S4, and the plurality of second state display pages 2S1, 2S2, 2S3 and 2S4. The electronic label 20 is a colorful-electronic ink paper.

Figure 6:
FIG. 6 is a schematic diagram showing the selection of the first state subpages in accordance with another preferred embodiment of the present invention.
Figure 7:
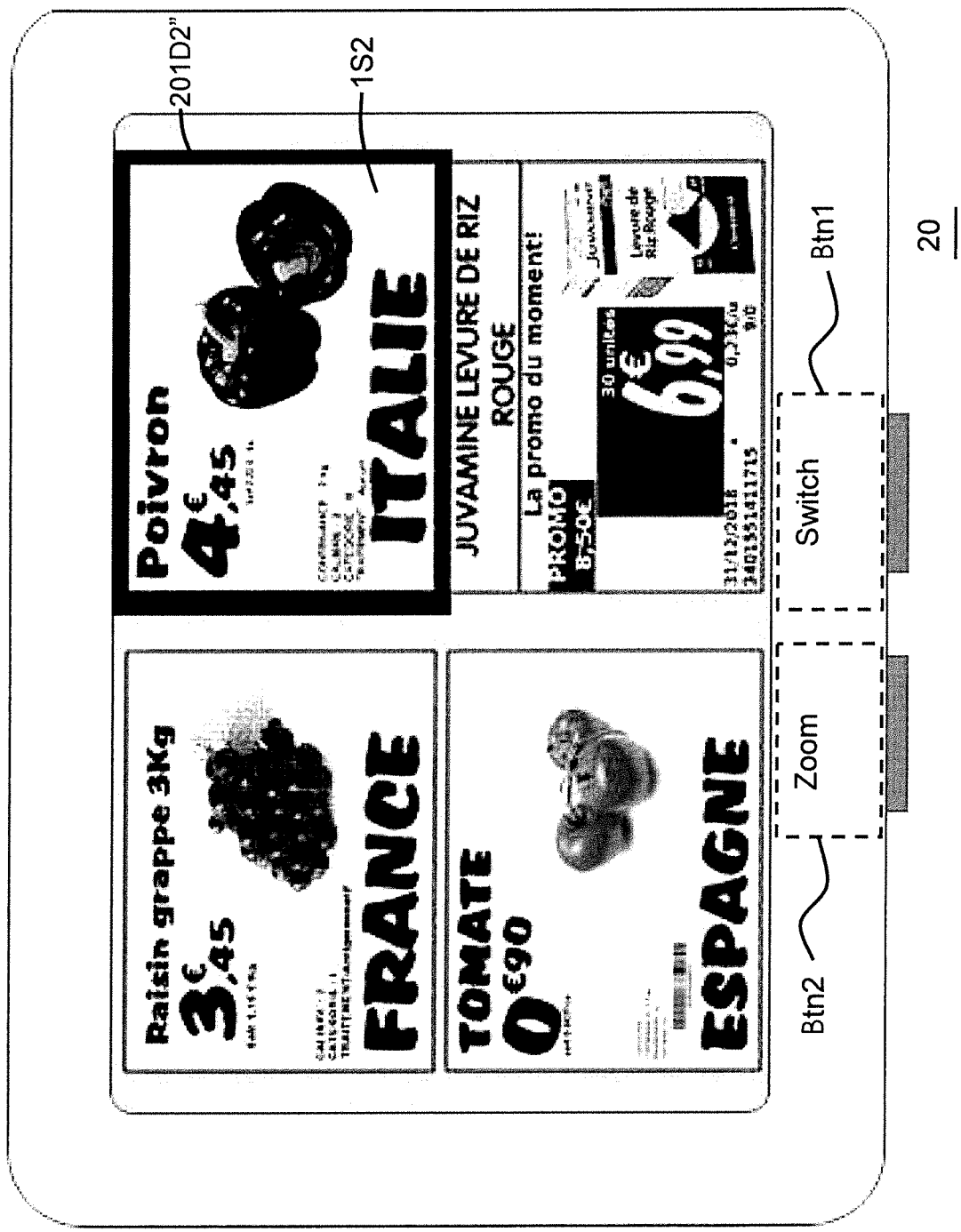
FIG. 7 is a schematic diagram showing the selection of the first state subpages in accordance with another preferred embodiment of the present invention.

In some embodiments, the selection of the first state subpages 1S1, 1S2, 1S3 and 1S4 can be indicated by an enclosure edge thereon, where the respective second sub-area (such as 201D1", 201D2", 201D3" or 201D4") is located. Please refer to FIGS. 6 and 7, which are schematic diagrams showing the selection of the first state subpages 1S1, 1S2, 1S3 and 1S4 in accordance with another preferred embodiment of the present invention. When the button Btn1 is pressed once (or the first operation is performed), the first state subpage 1S1 is selected, then the button Btn1 is pressed again, the first state subpage 1S2 is selected, then the button Btn2 is pressed (or the second operation is performed), and the second state display page 2S2 display on the entire display area 201D as referred to in FIG. 4.

In any previous embodiment, the second sub-area includes at least one of a peripheral area, a check box area, highlight, number and a circled area.

In some embodiments, if the first state subpages are larger than 4 pages, a first quarter-division page will go to a second (or next) quarter-division page when the button Btn1 is pressed on the fifth time, wherein the first quarter-division page includes the first state subpages 1S1, 1S2, 1S3 and 1S4, and the second quarter-division page includes the first state subpages 1S5, 1S6, 1S7 and 1S8 (not shown). The page code in the FIG. 2 will show 1/8, 2/8 . . . , 7/8 and 8/8. When the first quarter-division page goes to the next quarter-division page, this process also uses more update time because the entire display area 201D needs to be refreshed. However, compared with browsing among full pages, it is still efficient. Alternatively, more divided sub-pages can be arranged in the same full page, so it depends on the size of the display area 201D and whether the user can clearly view the visual contents or not. For a medium size electronic label, the display area 201D is about 5 inch×7 inch and the like. Other sizes of electronic labels are also suitable for the display method in the present disclosure.

Figure 8:
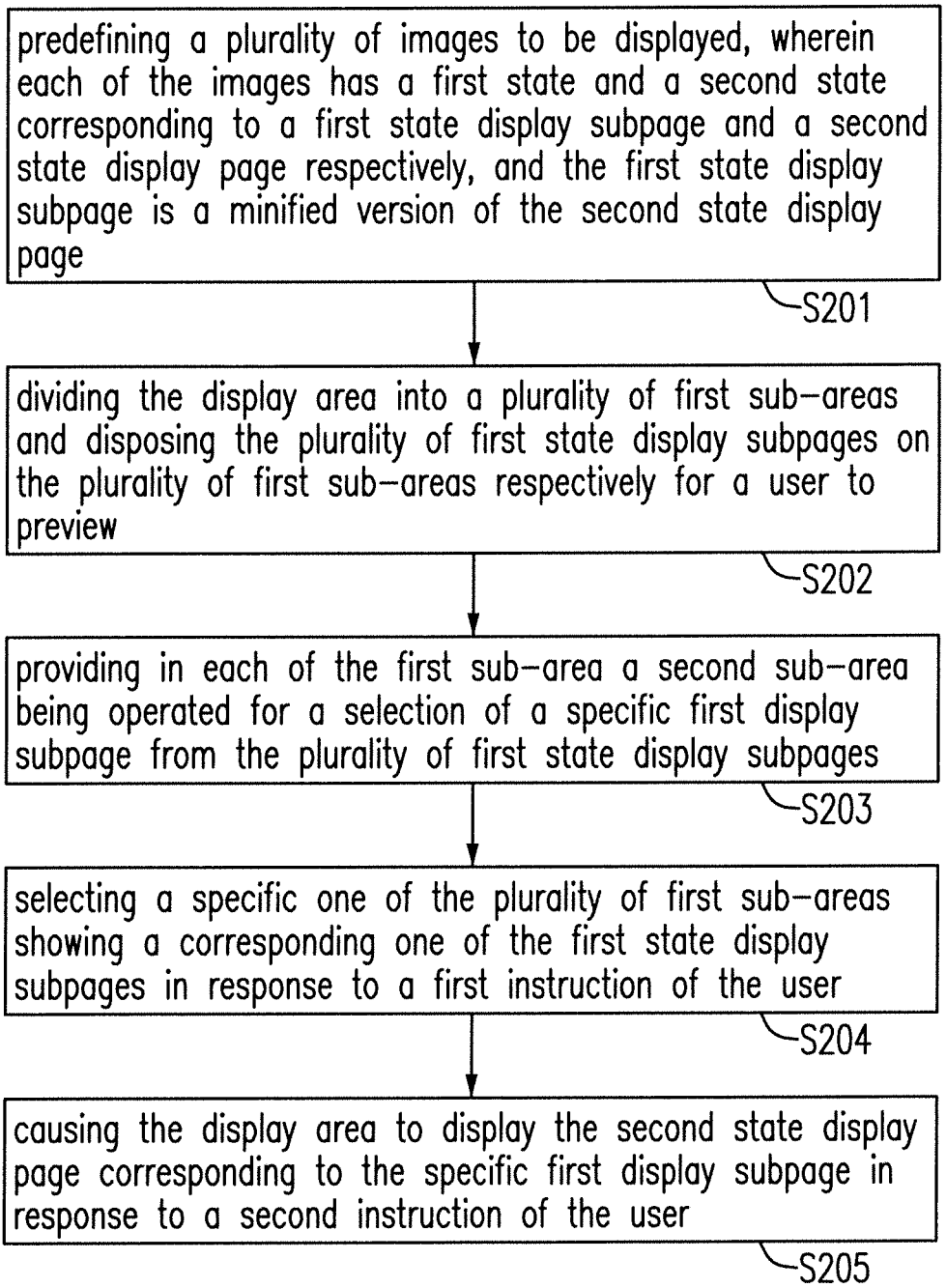
FIG. 8 is a schematic diagram showing a display method for an electronic label having a display area in accordance with a preferred embodiment of the present invention.

Please refer to FIG. 8, which is a schematic diagram showing a display method S20 for an electronic label having a display area in accordance with a preferred embodiment of the present invention. The display method S20 includes the following steps of: S201, predefining a plurality of images to be displayed, wherein each of the images has a first state and a second state corresponding to a first state display subpage and a second state display page respectively, and the first state display subpage is a minified version of the second state display page; S202, dividing the display area into a plurality of first sub-areas and disposing the plurality of first state display subpages on the plurality of first sub-areas respectively for a user to preview; S203, providing in each of the first sub-area a second sub-area being operated for a selection of a specific first display subpage from the plurality of first state display subpages; S204, selecting a specific one of the plurality of first sub-areas showing a corresponding one of the first state display subpages in response to a first instruction of the user; and S205, causing the display area to display the second state display page corresponding to the specific first display subpage in response to a second instruction of the user.

In any previous embodiment, the first instruction completes a selection of the specific first sub-area within a first time period, and the second instruction enables the display area to display the second state display page within a second time period, wherein the first time period is shorter than the second time period.

Figure 9:
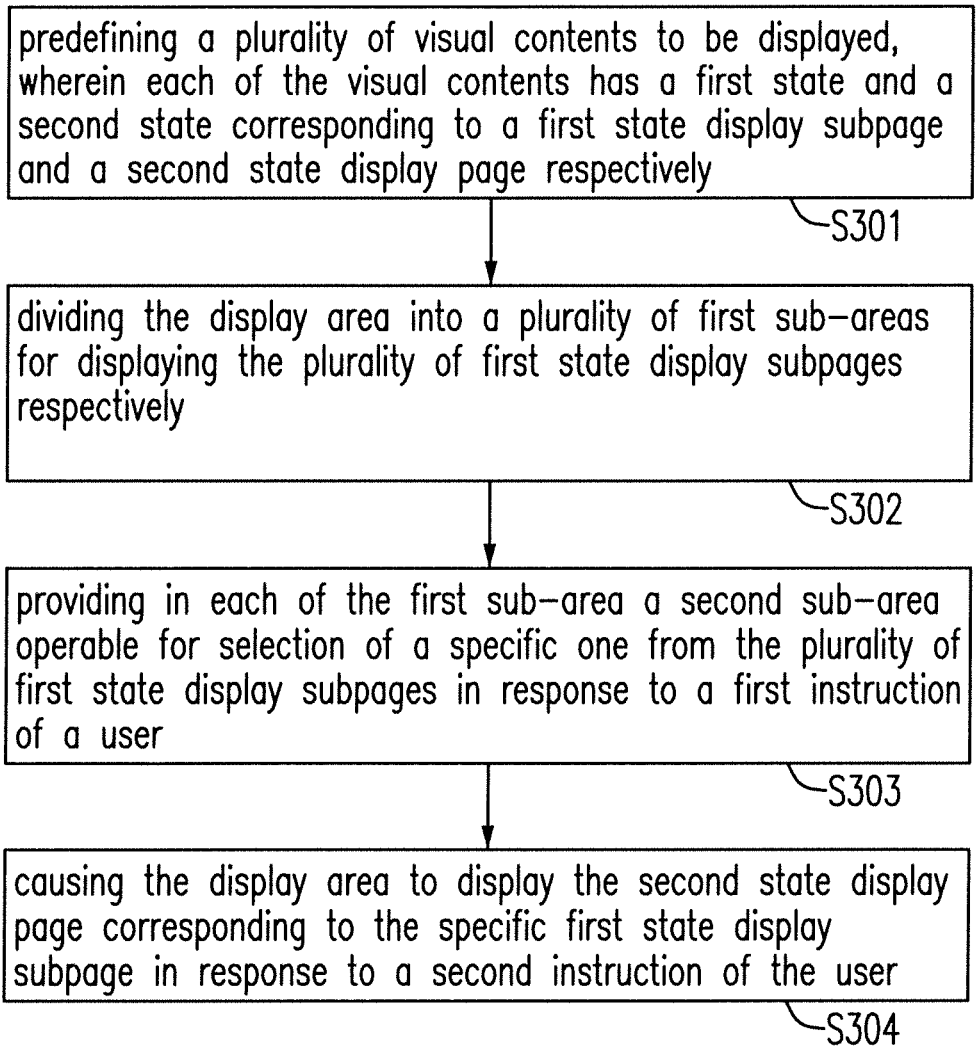
FIG. 9 is a schematic diagram showing a display method for an electronic label having a display area in accordance with another preferred embodiment of the present invention.

Please refer to FIG. 9, which is a schematic diagram showing a display method S30 for an electronic label having a display area in accordance with a preferred embodiment of the present invention. The display method S30 includes the following steps of: S301, predefining a plurality of visual contents to be displayed, wherein each of the visual contents has a first state and a second state corresponding to a first state display subpage and a second state display page respectively; S302, dividing the display area into a plurality of first sub-areas for displaying the plurality of first state display subpages respectively; S303, providing in each of the first sub-area a second sub-area operable for selection of a specific one from the plurality of first state display subpages in response to a first instruction of a user; and S304, causing the display area to display the second state display page corresponding to the specific first state display subpage in response to a second instruction of the user.

In any previous embodiment, the first state display subpage is a minified version of a corresponding second state display page; and the plurality of visual contents include at least one of an image, a text an icon and a symbol.

In any previous embodiment, the display method S30 further comprising the steps of: disposing the plurality of first state display subpages on the plurality of first sub-areas respectively for the user to preview; and selecting among the first sub-areas to lock in a specific one from the first state display subpages in response to the first instruction of the user.

In any previous embodiment, the first instruction is completed within a first time period, and there is a second instruction allowing the display area to display a specific second state display page within a second time period, wherein the first time period is shorter than the second time period.

In any previous embodiment, the first instruction allows selection among the plurality of first state display subpages; a third instruction of the user allows browsing among the plurality of second state display pages; the first instruction and the third instruction are respectively commanded through a first operation and a third operation of the user; a fourth instruction of the user changes the display area from displaying the second state display page back to displaying respective first state display subpages including the first selected display subpage; and the second instruction and the fourth instruction are respectively commanded through a second operation and a fourth of the user on the operating module.

While the invention has been described in terms of what is presently considered to be the most practical and preferred embodiments, it is to be understood that the invention need not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. An electronic label, comprising:
a display module having a display area;
a control module electrically connected to the display module, and configured to:
predefine a plurality of images to be displayed, wherein each of the images has a first state and a second state corresponding to a first state display subpage and a second state display page respectively, and the first state display subpage is a minified version of the second state display page; and divide the display area into a plurality of first sub-areas and dispose the plurality of first state display subpages on the plurality of first sub-areas respectively for a user to preview; and an operating module electrically connected to the control module, wherein the control module is set to include in each of the first sub-areas a second sub-area operable for selection of a specific one from the plurality of first state display subpages, selects a specific one from the plurality of first sub-areas displaying a corresponding one of the first state display subpages in response to a first instruction of the user, performs a refreshing process to refresh the second sub-area rather than the entire display area to indicate that the specific one of the plurality of first sub-areas corresponding to the second sub-area is selected, and causes the display area to display the second state display page corresponding to the specific first state display subpage in response to a second instruction of the user.

2. The electronic label as in claim 1, wherein the first instruction allows a selection among the first sub-areas within a first time period, and the second instruction allows the display area to be full of a specific second state display page within a second time period, wherein the first time period is shorter than the second time period.

3. The electronic label as in claim 1, wherein the second sub-area includes at least one of a peripheral area, a check box area, highlight, number and a circled area.

4. The electronic label as in claim 1, wherein the first instruction causes a specific second sub-area to be marked, and the second instruction allows the display area to be full of a specific second state display page.

5. The electronic label as in claim 1, wherein:
the first instruction allows a selection among the plurality of first state display subpages;
a third instruction of the user allows browsing among the plurality of second state display pages; and
the first instruction and the third instruction are respectively commanded through a first operation and a third operation of the user on the operating module.

6. The electronic label as in claim 1, wherein:
a fourth instruction of the user changes the display area from displaying the second state display page back to displaying respective first display subpages including the specific selected first display subpage; and
the second instruction and the fourth instruction are respectively commanded through a second operation and a fourth operation of the user on the operating module.

7. The electronic label as in claim 1, wherein:
the electronic label includes a memory configured to store the selected first display subpage, the plurality of first state display subpages, and the plurality of second state display pages; and
the electronic label is a colorful-electronic paper.

* * * * *